(12) United States Patent
Yamashita et al.

(10) Patent No.: US 12,034,159 B2
(45) Date of Patent: Jul. 9, 2024

(54) NON-AQUEOUS ELECTROLYTE SECONDARY BATTERY, METHOD OF MANUFACTURING SAME, AND NON-AQUEOUS ELECTROLYTE SECONDARY BATTERY SYSTEM

(71) Applicant: Maxell, Ltd., Kyoto (JP)

(72) Inventors: Akira Yamashita, Kyoto (JP); Haruki Kamizori, Kyoto (JP); Atsushi Hatakeyama, Kyoto (JP)

(73) Assignee: Maxell, Ltd., Kyoto (JP)

( * ) Notice: Subject to any disclaimer, the term of this patent is extended or adjusted under 35 U.S.C. 154(b) by 613 days.

(21) Appl. No.: 17/274,717

(22) PCT Filed: Sep. 9, 2019

(86) PCT No.: PCT/JP2019/035320
§ 371 (c)(1),
(2) Date: Mar. 9, 2021

(87) PCT Pub. No.: WO2020/054648
PCT Pub. Date: Mar. 19, 2020

(65) Prior Publication Data
US 2022/0052326 A1    Feb. 17, 2022

(30) Foreign Application Priority Data

Sep. 14, 2018   (JP) .................. 2018-172649

(51) Int. Cl.
*H01M 4/46*   (2006.01)
*H01M 4/485*   (2010.01)
(Continued)

(52) U.S. Cl.
CPC .......... *H01M 4/463* (2013.01); *H01M 4/485* (2013.01); *H01M 10/052* (2013.01);
(Continued)

(58) Field of Classification Search
CPC .... H01M 4/463; H01M 4/485; H01M 50/491; H01M 50/409489; H01M 10/052; H01M 10/46
(Continued)

(56) References Cited

U.S. PATENT DOCUMENTS

2017/0263926 A1* 9/2017 Hatakeyama ....... H01M 10/052
2018/0342758 A1  11/2018 Tang et al.
(Continued)

FOREIGN PATENT DOCUMENTS

EP    3 193 396 A1    7/2017
EP    3 370 294 A1    9/2018
(Continued)

OTHER PUBLICATIONS

Extended European Search Report for corresponding European Application No. 19859956.5, dated May 10, 2022.
(Continued)

*Primary Examiner* — Nathaniel R Pelton
(74) *Attorney, Agent, or Firm* — Birch, Stewart, Kolasch & Birch, LLP

(57) ABSTRACT

Provided are a non-aqueous electrolyte secondary battery excellent in reliability and productivity, a method for manufacturing the same, and a system including the non-aqueous electrolyte secondary battery.
A non-aqueous electrolyte secondary battery of the present invention includes a positive electrode, a negative electrode, a separator, and a non-aqueous electrolyte. The positive electrode includes a positive electrode mixture layer in which a lithium-containing composite oxide is used as a positive electrode active material. In a charged state, the negative electrode includes an aluminum foil or an aluminum alloy foil and a Li—Al alloy formed by reaction with Li ions deintercaleted from the positive electrode. The
(Continued)

Li—Al alloy has a Li content of 7 to 29 atomic % with respect to 100 atomic % of a total of Li and Al at the end of charge.

7 Claims, 2 Drawing Sheets

(51) Int. Cl.
    *H01M 10/052*     (2010.01)
    *H01M 10/46*     (2006.01)
    *H01M 50/409*     (2021.01)
    *H01M 50/491*     (2021.01)
    *H01M 4/02*     (2006.01)
    *H01M 50/489*     (2021.01)

(52) U.S. Cl.
    CPC ......... *H01M 10/46* (2013.01); *H01M 50/409* (2021.01); *H01M 50/491* (2021.01); *H01M 2004/021* (2013.01); *H01M 50/489* (2021.01)

(58) Field of Classification Search
    USPC ........................................................ 320/137
    See application file for complete search history.

(56) References Cited

U.S. PATENT DOCUMENTS

| 2019/0140261 A1* | 5/2019 | Yamamoto ............ H01M 4/587 |
| 2021/0194058 A1 | 6/2021 | Sekiya et al. |

FOREIGN PATENT DOCUMENTS

| JP | 7-320723 A | 12/1995 |
| JP | 8-293302 A | 11/1996 |
| JP | 2005-294013 A | 10/2005 |
| JP | WO2016/039323 A1 | 4/2017 |
| JP | 2019/129147 A | 8/2019 |
| WO | WO 2016/039323 A1 | 3/2016 |
| WO | WO2017/138361 A1 | 8/2017 |
| WO | WO2017/187638 A1 | 11/2017 |
| WO | WO 2017/190364 A1 | 11/2017 |

OTHER PUBLICATIONS

International Search Report for PCT/JP2019/035320 mailed on Nov. 12, 2019.

* cited by examiner

NON-AQUEOUS ELECTROLYTE SECONDARY BATTERY, METHOD OF MANUFACTURING SAME, AND NON-AQUEOUS ELECTROLYTE SECONDARY BATTERY SYSTEM

TECHNICAL FIELD

The present invention relates to a non-aqueous electrolyte secondary battery excellent in reliability and productivity, a method for manufacturing the same, and a system including the non-aqueous electrolyte secondary battery.

BACKGROUND ART

Non-aqueous electrolyte batteries are used in various applications, taking advantage of their characteristics such as high-capacity characteristics and high-voltage characteristics. In particular, the practical application of electric cars has resulted in an increase in demand for vehicle-mounted non-aqueous electrolyte batteries in recent years, for example.

While non-aqueous electrolyte batteries for vehicle application are mainly applied to driving power sources for motors in electric cars, they are being increasingly applied to other applications. For example, emergency call systems for making a report about, e.g., an accident of a vehicle to various related parties are currently under development, and the application of the non-aqueous electrolyte batteries to power sources for these systems is being looked into.

In practice, such systems operate in limited cases, but should reliably operate in the event of an emergency. Therefore, the batteries used as power sources are required to have reliability according to which their characteristics can be favorably maintained despite being stored for a long period of time. Accordingly, for such applications, non-aqueous electrolyte primary batteries are used that have better storage characteristics than non-aqueous electrolyte secondary batteries widely used as power sources of electronic devices and that have a capacity that is hard to decrease even after long-term storage of several years or more.

On the other hand, there is a demand for applying non-aqueous electrolyte secondary batteries to the applications as described above.

For a negative electrode active material of a non-aqueous electrolyte primary battery, a lithium alloy such as metallic lithium (Li) or a Li—Al (lithium-aluminum) alloy is used. A lithium alloy can also be used for a negative electrode active material in a non-aqueous electrolyte secondary battery. For example, Patent Document 1 discloses that a negative electrode is used in which a metal base layer made of a material that is not alloyed with Li and Al active layers made of Al and including an Li—Al alloy on a surface thereof are bonded to each other, and that storage characteristics of a non-aqueous electrolyte secondary battery (non-aqueous liquid electrolyte secondary battery) in a high temperature environment can be enhanced by providing the Al active layers on both surfaces of the metal base layer and making the metal base layer with a certain metal.

PRIOR ART DOCUMENTS

Patent Document

Patent Document 1: JPWO 2016/039323

DISCLOSURE OF INVENTION

Problem to be Solved by the Invention

However, the present inventors' studies revealed that when many non-aqueous electrolyte secondary batteries of Patent Document 1 that included the negative electrode constituted by bonding the metal base layer and the Al active layers to each other were manufactured, the occurrence ratio of those having a low open circuit voltage (OCV) was relatively high, and it was difficult to manufacture highly reliable batteries with good production efficiency.

The present invention was achieved in light of the aforementioned circumstances, and it is an object thereof to provide a non-aqueous electrolyte secondary battery excellent in reliability and productivity, a method for manufacturing the same, and a system including the non-aqueous electrolyte secondary battery.

Means for Solving Problem

In order to achieve the above object, a non-aqueous electrolyte secondary battery of the present invention includes a positive electrode, a negative electrode, a separator, and a non-aqueous electrolyte. The positive electrode includes a positive electrode mixture layer in which a lithium-containing composite oxide is used as a positive electrode active material. In a charged state, the negative electrode includes an aluminum foil or an aluminum alloy foil and a Li—Al alloy formed by reaction with Li ions deintercaleted from the positive electrode. The Li—Al alloy has a Li content of 7 to 29 atomic % with respect to 100 atomic % of a total of Li and Al at the end of charge.

The non-aqueous electrolyte secondary battery of the present invention can be manufactured by, e.g., a manufacturing method of the present invention in which the aluminum foil or the aluminum alloy foil having a thickness of 40 μm or more is used for the negative electrode.

A non-aqueous electrolyte secondary battery system of the present invention includes the non-aqueous electrolyte secondary battery of the present invention and a charging circuit for charging the non-aqueous electrolyte secondary battery. In the charging circuit, an end-of-charge condition is set so that the Li content with respect to 100 atomic % of the total of Li and Al in the negative electrode of the non-aqueous electrolyte secondary battery is 7 to 29 atomic % at the end of charge.

Effects of the Invention

The present invention can provide a non-aqueous electrolyte secondary battery excellent in reliability and productivity, a method for manufacturing the same, and a system including the non-aqueous electrolyte secondary battery.

DESCRIPTION OF THE INVENTION

Figure 1:
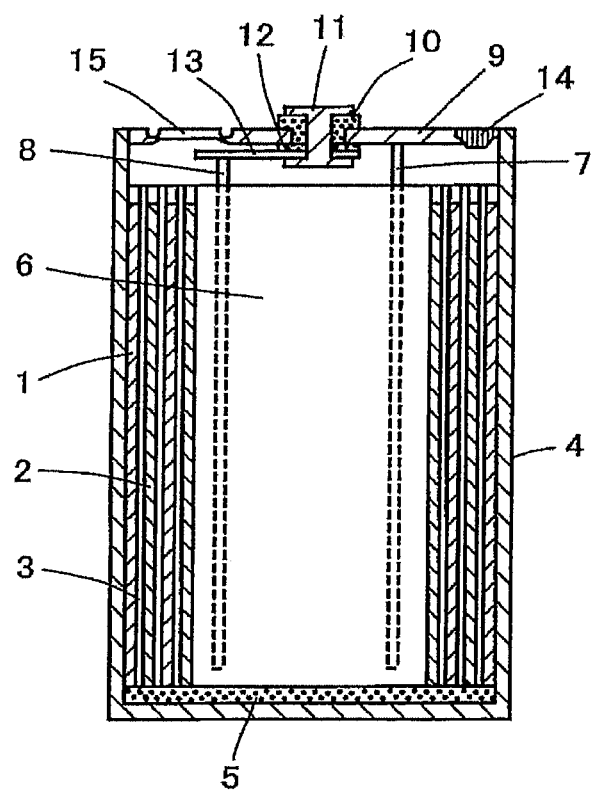
FIG. 1 is a longitudinal partial cross-sectional view, schematically illustrating an example of a non-aqueous electrolyte secondary battery of the present invention.

In the non-aqueous electrolyte secondary battery including the negative electrode constituted by bonding the metal base layer and the Al active layers to each other, the metal base layer functioning as a current collector and Al layers (Al metal layers or Al alloy layers) are bonded to each other. Li ions deintercaleted from a positive electrode active material of a positive electrode by the charge of the battery form Li—Al alloys on the surfaces of the Al layers, thereby changing the Al layers into the Al active layers. As described above, the occurrence ratio of those causing a decrease in the OCV is relatively high among such non-aqueous electrolyte secondary batteries.

The present inventors further studied the above-described decrease in the OCV in the non-aqueous electrolyte secondary batteries, and consequently found the following. In the batteries that had caused the decrease in the OCV, an Al layer (Al active layer) of the negative electrode was partially peeled off from the metal base layer, and the peeled Al layer pressed a separator, causing a position at which a distance between the negative electrode and the positive electrode was very small. Thus, a micro-short circuit occurred.

During initial charge in the manufacture of a non-aqueous electrolyte secondary battery, gas is generated in the battery. When the gas is held in the separator or on a negative electrode surface, Li ions deintercaleted from the positive electrode cannot pass therethrough. Thus, an unreacted position occurs in the negative electrode. Moreover, since the Li ions that should originally react at the unreacted position collect at a different position in the negative electrode at which they can react, a position receiving an excessive amount of the Li ions occurs around the unreacted position. In the case of the above-described negative electrode constituted by bonding the Al layers (Al active layers) and the metal base layer, the thicknesses of the Al layers are limited to some extent from the viewpoint of preventing the thickness of the negative electrode from being too large. Thus, the following is assumed. The amount of Al may be insufficient at the position receiving an excessive amount of the Li ions, and the ratio of Li in the produced Li—Al alloys may be high. Thus, abnormal expansion may occur, which may cause the peeling from the metal base layer.

Thus, the present inventors further studied and found the following. An Al metal foil or Al alloy foil (hereinafter, both may be referred to as the "Al foil" together) was used for a negative electrode, and the ratio of Li with respect to 100 atomic % of the total of Li and Al was set to be a certain value. In this case, even if unevenness in reaction, in which an unreacted position with Li ions and a position receiving a large amount of the Li ions occurred, was caused in the negative electrode, the degree of the unevenness was small. Thus, the occurrence of a micro-short circuit due to the pressing of a separator was able to be suppressed. Then, such a configuration has been employed in the present invention, and has enabled the provision of a highly reliable non-aqueous electrolyte secondary battery with good productivity.

An Al foil (Al metal foil or Al alloy foil) is used for a negative electrode of a non-aqueous electrolyte secondary battery. Examples of the foil constituting the negative electrode include a foil (Al metal foil) made of Al and unavoidable impurities and a foil constituted by an Al alloy containing Fe, Ni, Co, Mn, Cr, V, Ti, Zr, Nb, Mo, and/or other alloying components as an alloying component(s) and the remainder that are Al and unavoidable impurities (the content of the alloying component(s) is, e.g., 50 mass % or less in total).

In a charged state, a thickness of the Al metal foil or Al alloy foil in a portion of the negative electrode that does not face a positive electrode mixture layer is preferably 40 μm or more, more preferably 45 μm or more, and further preferably 50 μm or more from the viewpoints of handleability during production and adjusting a Li content described later to suppress the occurrence of batteries having a low OCV. However, if the Al metal foil or Al alloy foil is too thick, the negative electrode occupies an extremely large percentage of the inner volume of the battery, which may cause a problem of e.g., a decrease in the capacity. Thus, the thickness of the Al metal foil or Al alloy foil in the portion of the negative electrode in the charged state that does not face the positive electrode mixture layer is preferably 100 μm or less, and more preferably 80 μm or less.

In the negative electrode, Li deintercaleted from the positive electrode mixture layer by charge reacts with the Al foil to form a Li—Al alloy. Thus, in a portion of the negative electrode in the charged state that faces a positive electrode, the thickness of an unreacted region of the Al foil excluding a portion where the Li—Al alloy is formed on a surface of the Al foil is smaller than that of the Al foil used for the assembly of the battery. Thus, when the thickness of the Al foil (Al metal foil or Al alloy foil) of the negative electrode in the charged state is determined in the non-aqueous electrolyte secondary battery of the present invention, the determination is performed at a position that does not faces the positive electrode mixture layer and at which the Li—Al alloy is not formed.

Thus, it is sufficient that the thickness of the Al metal foil or Al alloy foil used for the negative electrode is the same as that of the Al foil in the portion of the negative electrode in the charged state that does not face the positive electrode mixture layer. Specifically, the thickness is preferably 40 μm or more, and more preferably 50 μm or more. Moreover, the thickness is preferably 100 μm or less, and more preferably 80 μm or less.

When a single Al metal foil or Al alloy foil that does not include a metal base layer described later is used, the thickness of the Al metal foil or Al alloy foil in the portion of the negative electrode in the charged state that does not face the positive electrode mixture layer, and the thickness of the Al metal foil or Al alloy foil used for the negative electrode can be measured using, e.g., an "indicator 543 series" manufactured by Mitutoyo Corporation. Moreover, when a negative electrode in which an Al metal foil or Al alloy foil and a metal base layer are bonded to each other is used, only the Al foil portion is dissolved in a sodium hydroxide aqueous solution (5 mol/L), and the thickness of the Al foil can be calculated from the weight of the dissolved Al and the Al specific gravity. All values described in examples described later were measured by these methods.

It is sufficient that in the negative electrode, the thickness of the Al foil in the portion of the negative electrode in the charged state that does not face the positive electrode mixture layer satisfies the thickness described above. The negative electrode may be that in which an Al metal foil or Al alloy foil and a metal base layer (made of, e.g., a Cu alloy, a Ni alloy) functioning as a current collector are bonded to each other (e.g., a clad material). However, it is preferable that the negative electrode does not include the metal base layer from the viewpoint of suppressing an increase in the thickness of the negative electrode.

Moreover, in the charged state of the battery, the negative electrode includes the Li—Al alloy formed on, e.g., the surface of the Al foil by the reaction of the Al foil with Li ions deintercaleted from the positive electrode (positive electrode active material).

The non-aqueous electrolyte secondary battery has a Li content of 7 atomic % or more with respect to 100 atomic % of the total of Li and Al in the negative electrode at the end of charge of the battery. The problem of the above-described decrease in the OCV tends to occur in a non-aqueous electrolyte secondary battery controlled so as to have such a Li content in a negative electrode at the end of charge. In other words, the problem of the decrease in the OCV that should be solved by the present invention is hard to occur in a battery having a Li content of less than 7 atomic % in a negative electrode at the end of charge.

If the Li content in the total of Li and Al in the negative electrode increases at the end of charge, the irreversible capacity of the negative electrode may increase, and the charge-discharge cycle characteristics may significantly deteriorate. Thus, from the viewpoint of enhancing the charge-discharge cycle characteristics of the battery, the Li content with respect to 100 atomic % of the total of Li and Al in the negative electrode at the end of charge is 29 atomic % or less.

Moreover, the Li content with respect to 100 atomic % of the total of Li and Al in the negative electrode at the end of charge is preferably 25 atomic % or less, more preferably 20 atomic % or less, and further preferably 15 atomic % or less. Although a nonwoven fabric is preferably used for a separator from the viewpoint of more highly suppressing the problem of the above-described decrease in the OCV as will be described later, in a non-aqueous electrolyte secondary battery in which a Li—Al alloy is produced in a negative electrode by charge, pulverization occurs at a position where the Li—Al alloy has been produced, and powder easily drops off from the negative electrode. When a separator having relatively large voids such as a nonwoven fabric is used, fine powder that has dropped off from the negative electrode may pass through the voids of the separator, reach the positive electrode, and cause the occurrence of a micro-short circuit. However, the battery controlled so as to have a small Li content as described above in the negative electrode at the end of charge can lower the ratio of small sized powder in fine powder formed when the Li—Al alloy is produced in the negative electrode by charge, and thus the effects of suppressing the occurrence of the above problem due to the passage of the above-described fine powder through the separator made of the nonwoven fabric can be expected.

In the present specification, the Li content with respect to 100 atomic % of the total of Li and Al in the negative electrode at the end of charge of the non-aqueous electrolyte secondary battery indicates a value calculated by disassembling the battery at the end of charge, removing the negative electrode, cutting a portion of the negative electrode that has a predetermined area, dissolving the portion in an acid, and then determining the amounts of Li and Al in the solution by an inductively-coupled plasma (ICP) emission spectrometry (calibration curve method).

Since the non-aqueous electrolyte secondary battery of the present invention is manufactured with positive electrode capacity regulation, the time at which charge has been terminated can be detected by controlling, e.g., the charging electric quantity or charging voltage, and thus an end-of-charge condition can be set in advance on a charging circuit side. In other words, in the non-aqueous electrolyte secondary battery, the Li content with respect to 100 atomic % of the total of Li and Al in the negative electrode at the end of charge can be controlled by setting the end-of-charge condition of a charging circuit used for the charge.

Thus, in order to control the Li content in the negative electrode at the end of charge in the non-aqueous electrolyte secondary battery as described above, for example, it is sufficient that the end-of-charge condition of the charging circuit is set so that the Li content is the values described above in a non-aqueous electrolyte secondary battery system including the non-aqueous electrolyte secondary battery and the charging circuit.

The negative electrode (e.g., the Al foil thereof or metal base layer) can be provided with a negative electrode lead body using an ordinary method before the assembly of the battery.

The positive electrode of the non-aqueous electrolyte secondary battery may have a structure in which the positive electrode mixture layer containing, e g, a positive electrode active material, a conductive assistant, and a binder is formed on one surface or both surfaces of a current collector.

For the positive electrode active material, a lithium-containing composite oxide (lithium-containing composite oxide capable of absorbing and desorbing Li ions) is used. Examples thereof include; lithium-containing composite oxides having a layer structure represented by $Li_{1+x}M^1O_2$ ($-0.1<x<0.1$, $M^1$; e.g., Co, Ni, Mn, Al, Mg); lithium manganese oxides having a spinel structure such as $LiMn_2O_4$ and substitution products thereof obtained by substituting a portion of the elements in $LiMn_2O_4$ with other elements; and olivine compounds represented by $LiM^2PO_4$($M^2$: e.g., Co, Ni, Mn, Fe). Specific examples of the lithium-containing composite oxides having a layer structure include a lithium cobalt oxide such as $LiCoO_2$, $LiNi_{1-a}Co_{a-b}Al_bO_2$($0.1 \leq a \leq 0.3$, $0.01 \leq b \leq 0.2$), and oxides containing at least Co, Ni, and Mn (e.g., $LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$). For the positive electrode active material, the above examples of the lithium-containing composite oxide may be used individually or in combination of two or more.

Examples of the conductive assistant of the positive electrode mixture layer include the following: carbon materials such as carbon blacks (e.g., acetylene black, Ketjenblack, channel black, furnace black, lamp black, thermal black) and carbon fibers; conductive fibers such as metallic fibers; carbon fluoride; powders of metals such as copper and nickel; and organic conductive materials such as polyphenylene derivatives.

Examples of the binder of the positive electrode mixture layer include polyvinylidene fluoride (PVDF), polytetrafluoroethylene (PTFE), styrene butadiene rubber (SBR), carboxymethyl cellulose (CMC), and polyvinylpyrrolidone (PVP).

The positive electrode can be produced, e.g., by the following steps. A positive electrode mixture containing, e.g., the positive electrode active material, the conductive assistant, the binder is dispersed in a solvent (organic solvent such as NMP, or water) to prepare a positive electrode mixture-containing composition (e.g., paste, slurry). The positive electrode mixture-containing composition is applied to, e.g., one surface or both surfaces of the current collector, and dried, and subjected to pressing as necessary.

The positive electrode can also be obtained by forming a molded body using the positive electrode mixture, and laminating part or the entire of one surface of the molded body to the positive electrode current collector. The positive electrode mixture molded body may be laminated to the positive electrode current collector, e.g., by pressing.

The current collector of the positive electrode may be a foil, a punching metal, a mesh, or an expanded metal made of a metal such as aluminum or an aluminum alloy. Typically, an aluminum foil is preferably used. The thickness of the positive electrode current collector is preferably 10 to 30 µm.

The positive electrode mixture layer preferably has a composition of, e.g., 80.0 to 99.8 mass % of the positive electrode active material, 0.1 to 10 mass % of the conductive assistant, and 0.1 to 10 mass % of the binder. Moreover, the positive electrode mixture layer has a thickness of preferably 30 to 300 μm per surface of the current collector.

It is preferable that in the positive electrode, the positive electrode mixture layer has a mass of 7 mg/cm$^2$ or more and 12.5 mg/cm$^2$ or less per surface of the positive electrode current collector. Thus, while the movement distance of Li ions in the positive electrode mixture layer can be reduced, a certain amount of the positive electrode active material can be obtained, and a load in high rate discharge can be reduced.

The current collector of the positive electrode can be provided with a positive electrode lead body using an ordinary method.

In the non-aqueous electrolyte secondary battery, the positive electrode and the negative electrode are used, e.g., in the form of an electrode body constituted by stacking the positive electrode and the negative electrode with the separator being interposed therebetween, a wound electrode body obtained by spirally winding the electrode body, or a stacked electrode body obtained by alternately stacking a plurality of positive electrodes and a plurality of negative electrodes.

For the separator, for example, a nonwoven fabric or a microporous membrane (microporous film) is used. Examples of a material therefor include polyolefins such as polyethylene (PE), polypropylene (PP), and ethylene-propylene copolymers. In addition, examples of the material include a fluororesin such as tetrafluoroethylene-perfluoroalkoxy ethylene copolymer (PFA); polyphenylene sulfide (PPS); polyether ether ketone (PEEK); polybutylene terephthalate (PBT); polymethylpentene; polyamide; polyimide; aramid; and cellulose when heat resistance is required according to the application of the battery. The above examples of the material for the nonwoven fabric or microporous membrane may be used individually or in combination of two or more. Moreover, the nonwoven fabric or microporous membrane as the separator may have a single layer structure made of one of the examples of the material, or, e.g., a laminated structure in which a plurality of nonwoven fabrics or microporous membranes made of different materials are laminated.

Among these, the separator made of the nonwoven fabric is more preferred. As described above, the problem of the above-described decrease in the OCV in a non-aqueous electrolyte secondary battery occurs mainly due to gas generated during initial charge in the manufacture of the battery. When the separator made of the nonwoven fabric is used, such gas is hardly to be held in the separator or on a negative electrode surface, and unevenness in reaction can be suppressed at the formation of the Li—Al alloy in the negative electrode. Therefore, the effects of suppressing the occurrence of the problem of the low OCV become more favorable.

The separator has a thickness of preferably 10 μm or more and less than 35 μm. When the thickness is within the range, the separator strength can be kept, and the battery energy density can be enhanced. If the thickness of the separator is 35 μm or more, the battery energy density decreases, but the problem of the low OCV is hard to occur. This is because, even when irregularities are produced on the negative electrode surface due to the unevenness in reaction at the formation of the Li—Al alloy, the thickness of the separator absorbs the irregularities to hardly cause a micro-short circuit.

Moreover, from the viewpoint of favorably suppressing the residence of gas in the separator to more favorably suppress the problem of the decrease in the OCV of the battery, the separator has a porosity of preferably 55% or more, more preferably 65% or more, and most preferably 69% or more. However, if the porosity of the separator is too large, the separator may have insufficient strength. Thus, the porosity of the separator is preferably 80% or less.

In the present specification, the porosity of the separator indicates a value calculated by obtaining the sum of constituent components i using the following formula (1) from the thickness of the separator, the mass thereof per area, and the density of each component thereof.

$$P=100-(\Sigma a_i/\rho_i)\times(m/t) \tag{1}$$

Here, in the formula (1), $a_i$ represents the ratio of the component i by mass %; ρi represents the density (g/cm$^3$) of the component i; m represents the mass of the separator per unit area (g/cm$^2$); and t represents the thickness (cm) of the separator.

A non-aqueous electrolyte of the non-aqueous electrolyte secondary battery may be, e.g., a solution (non-aqueous liquid electrolyte) prepared by dissolving a lithium salt in a non-aqueous solvent described below.

Examples of the solvent include aprotic organic solvents such as ethylene carbonate (EC), propylene carbonate (PC), butylene carbonate (BC), dimethyl carbonate (DMC), diethyl carbonate (DEC), methylethyl carbonate (MEC), γ-butyrolactone (γ-BL), 1,2-dimethoxyethane (DME), tetrahydrofuran (THF), 2-methyltetrahydrofuran, dimethyl sulfoxide (DMSO), 1,3-dioxolane, formamide, dimethylformamide (DMF), dioxolane, acetonitrile, nitromethane, methyl formate, methyl acetate, phosphoric acid triester, trimethoxymethane, dioxolane derivatives, sulfolane, 3-methyl-2-oxazolidinone, propylene carbonate derivatives, tetrahydrofuran derivatives, diethylether, and 1,3-propanesultone. The above examples of the solvent may be used individually or as a mixed solvent of a mixture of two or more thereof.

Examples of the lithium salt in the non-aqueous liquid electrolyte include $LiClO_4$, $LiPF_6$, $LiBF_4$, $LiAsF_6$, $LiSbF_6$, $LiCF_3SO_3$, $LiCF_3CO_2$, $Li_2C_2F_4(SO_3)_2$, $LiN(CF_3SO_2)_2$, $LiC(CF_3SO_2)_3$, $LiCnF_{2n+1}SO_3(n\geq 2)$, $LiN(RfOSO_2)_2$ (where Rf represents a fluoroalkyl group), and at least one selected from these is used. The lithium salt in the liquid electrolyte has a concentration of preferably 0.6 to 1.8 mol/l, and more preferably 0.9 to 1.6 mol/l.

An additive can also be added to the non-aqueous liquid electrolyte as appropriate in order to further improve various characteristics of the battery. Examples of the additive include vinylene carbonates, sultone compounds (e.g., 1,3-propanesultone, 1,4-butanesultone, 1,3-propenesultone), an organic lithium borate such as lithium bis(oxalate) borate, lithium monofluorophosphate ($Li_2PO_3F$), lithium difluorophosphate ($LiPO_2F_2$), diphenyl disulfide, cyclohexylbenzene, biphenyl, fluorobenzene, t-butylbenzene, a phosphoric acid compound such as tris(trimethylsilyl) phosphate, and a boric acid compound such as tris(trimethylsilyl) borate.

Furthermore, the non-aqueous electrolyte may also be made into a solid, e.g., a gel (gel-like electrolyte) by adding a gelling agent such as a known polymer to the non-aqueous liquid electrolyte.

The non-aqueous electrolyte secondary battery is manufactured, e.g., by placing an electrode body in an outer case body, injecting the non-aqueous electrolyte into the outer case body to immerse the electrode body in the non-aqueous electrolyte, and then sealing an opening of the outer case body. The outer case body may be, e.g., a tubular outer can (e.g., a prismatic outer can, a cylindrical outer can) made of steel, aluminum, or an aluminum alloy, or may be, e.g., an outer case body made of a laminated film obtained through metal vapor deposition.

In the non-aqueous electrolyte secondary battery of the present invention, the composition of the Li—Al alloy (Li content) in the negative electrode in the charged state can be controlled by adjusting the amount of the positive electrode mixture layer in the positive electrode, and can be controlled by adjusting the end-of-charge condition with the charging circuit charging the non-aqueous electrolyte secondary battery as described above.

In other word, the present invention also includes the non-aqueous electrolyte secondary battery system including the non-aqueous electrolyte secondary battery of the present invention and the charging circuit. In the charging circuit, the end-of-charge condition is set so that the Li content with respect to 100 atomic % of the total of Li and Al in the negative electrode of the non-aqueous electrolyte secondary battery is 7 to 29 atomic % at the end of charge.

EXAMPLES

Hereinafter, the present invention will be described in detail by way of examples. However, the present invention is not limited to the following examples.

Example 1

<Production of Negative Electrode>
An Al alloy foil (thickness: 70 μm) of alloy No. 1N30 in accordance with JIS standards amended in 2014 that was made into a size of 950 mm×44.5 mm was used for a negative electrode. A lead body made of nickel for the conductive connection with the outside of the battery was attached to the Al alloy foil.

<Production of Positive Electrode>
A slurry was prepared by dispersing 97 parts by mass of $LiNi_{0.8}Co_{0.15}Al_{0.05}O_2$ as a positive electrode active material, 1.5 parts by mass of acetylene black as a conductive assistant, and 1.5 parts by mass of PVDF as a binder in NMP. The slurry was applied to both surfaces of an Al foil having a thickness of 12 μm, dried, and subjected to pressing. Thus, a positive electrode mixture layer with a mass of 11 mg/cm² per surface of the Al foil current collector was formed. Furthermore, while the positive electrode mixture layer was subjected to pressing, a lead body made of aluminum was attached. Thus, a strap-shaped positive electrode with a length of 940 mm and a width of 43 mm was produced.

<Preparation of Non-Aqueous Liquid Electrolyte>
$LiBF_4$ was dissolved at a concentration of 1.2 mol/l in a mixed solvent containing propylene carbonate (PC) and ethylmethyl carbonate (EMC) at a volume ratio of 20:80, and tris(trimethylsilyl) phosphate (TMSP) in an amount of 3 mass % was further added to prepare a non-aqueous liquid electrolyte.

<Assembly of Battery>
The positive electrode and the negative electrode were laminated with a nonwoven fabric (thickness: 20 μm, porosity: 69%) as a separator that was made of cellulose being interposed therebetween and disposed proximately to the positive electrode mixture layer. The laminate was spirally wound, and then pressed into a flat shape in cross section.

Thus, a flat wound electrode body was produced. The flat wound electrode body was inserted into a rectangular battery container having a thickness of 0.8 mm and made of an aluminum alloy, and the non-aqueous liquid electrolyte was injected thereto. Thereafter, the battery container was sealed. Thus, a rectangular non-aqueous electrolyte secondary battery (size: 103450) having a standard capacity of 1000 mAh and a structure illustrated in FIGS. 1 and 2 was assembled.

Here, the battery illustrated in FIGS. 1 and 2 will be described. FIG. 1 is a partial cross-sectional view thereof. A positive electrode 1 and a negative electrode 2 are spirally wound with a separator 3 interposed therebetween, and then pressed into a flat shape, and thus a flat wound electrode body 6 is formed. The flat wound electrode body 6 is accommodated in a rectangular (prismatic) battery container 4 together with the non-aqueous liquid electrolyte. However, layers in the positive electrode 1 and layers in the negative electrode 2, the non-aqueous liquid electrolyte are not illustrated in FIG. 1 in order to prevent the figures from being complicated.

The battery container 4 is made of an aluminum alloy and constitutes an outer case body of the battery. The battery container 4 also serves as a positive electrode terminal. An insulator 5 made of a PE sheet is disposed on the bottom portion of the battery container 4. A positive electrode lead body 7 and a negative electrode lead body 8 that are respectively connected to one end of the positive electrode 1 and one end of the negative electrode 2 are drawn out from the flat wound electrode body 6 constituted by the positive electrode 1, the negative electrode 2, and the separator 3. Moreover, a terminal 11 made of stainless steel is attached to a sealing cover plate 9 made of an aluminum alloy for sealing an opening of the battery container 4, via an insulating packing 10 made of polypropylene. A lead plate 13 made of stainless steel is attached to the terminal 11 via an insulator 12.

The cover plate 9 is inserted into the opening of the battery container 4. The opening of the battery container 4 is sealed by welding a joint between the cover plate and the battery container, and thus the inside of the battery is sealed. In the battery in FIG. 1, the cover plate 9 is provided with a non-aqueous liquid electrolyte inlet 14. The non-aqueous liquid electrolyte inlet 14 is sealed by, e.g., laser welding with a sealing member inserted therein, and thus the sealing of the battery is secured. Furthermore, a cleavage vent 15 as a mechanism for discharging an internal gas to the outside when the temperature of the battery rises is provided in the cover plate 9.

In the battery of Example 1, the battery container 4 and the cover plate 9 are allowed to function as a positive electrode terminal by directly welding the positive electrode lead body 7 to the cover plate 9. Moreover, the terminal 11 is allowed to function as a negative electrode terminal by welding the negative electrode lead body 8 to the lead plate 13 to electrically connect the negative electrode lead body 8 to the terminal 11 via the lead plate 13. However, the positive and negative sides may be reversed depending on, e.g., the material of battery container 4.

Figure 2:
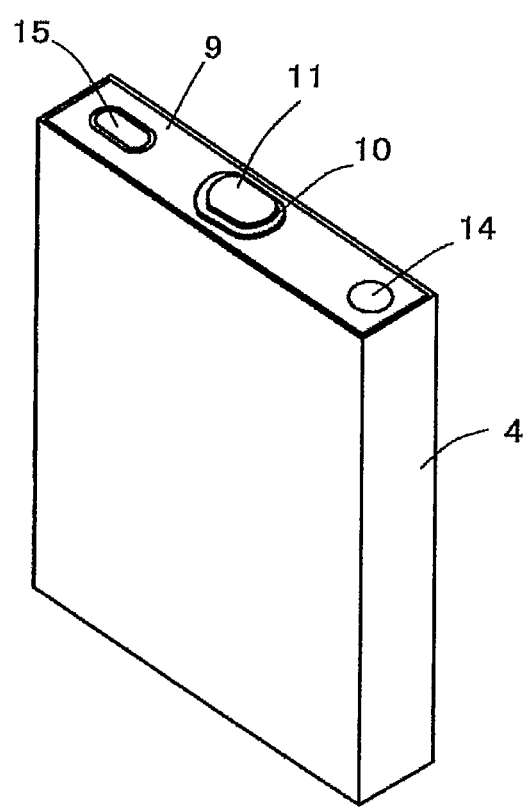
FIG. 2 is a perspective view of FIG. 1.

FIG. 2 is a perspective view schematically illustrating the external appearance of the battery illustrated in FIG. 1. FIG. 2 is illustrated to indicate that the battery is a rectangular battery. The battery is schematically illustrated in FIG. 2, and only specific constituent members of the battery are illustrated. Moreover, the portion on the internal peripheral side of the electrode body is not illustrated in cross section in FIG. 1.

Example 2

A rectangular non-aqueous electrolyte secondary battery was produced in the same manner as in Example 1 except that a microporous membrane (thickness: 20 μm, porosity: 46%) made of polyethylene was used as a separator.

Example 3

A negative electrode was produced in the same manner as in Example 1 except that the thickness of the Al alloy foil was changed to 50 μm. A rectangular non-aqueous electrolyte secondary battery was produced in the same manner as in Example 2 except that the negative electrode was used.

Example 4

A negative electrode was produced in the same manner as in Example 1 except that the thickness of the Al alloy foil was changed to 80 μm. Moreover, a positive electrode was produced in the same manner as in Example 1 except that the mass of the positive electrode mixture layer was changed to 8.0 mg/cm$^2$ per surface of an Al current collector. Furthermore, a rectangular non-aqueous electrolyte secondary battery was produced in the same manner as in Example 2 except that the positive electrode and the negative electrode were used.

Comparative Example 1

A negative electrode was produced in the same manner as in Example 1 except that a clad material in which individual Al foils having a thickness of 17.5 μm were bonded to both surfaces of a Cu foil having a thickness of 25 μm was used instead of an Al alloy foil. Moreover, a positive electrode was produced in the same manner as in Example 1 except that the mass of the positive electrode mixture layer was changed to 12.7 mg/cm$^2$ per surface of an Al current collector.

A rectangular non-aqueous electrolyte secondary battery was produced in the same manner as in Example 2 except that the negative electrode and the positive electrode were used.

Comparative Example 2

A rectangular non-aqueous electrolyte secondary battery was produced in the same manner as in Comparative Example 1 except that a separator (porosity: 49%) including a heat-resistant porous layer (thickness of 4 μm) containing boehmite particles and an acrylic resin (binder) on one surface of a microporous membrane made of polyethylene and having a thickness of 16 μm was used instead of the microporous membrane made of polyethylene and a flat wound electrode body was formed by laminating the separator so that the heat-resistant porous layer thereof faced the positive electrode.

Comparative Example 3

A negative electrode was produced in the same manner as in Example 1 except that the thickness of the Al alloy foil was changed to 40 μm. Moreover, a rectangular non-aqueous electrolyte secondary battery was produced in the same manner as in Comparative Example 1 except that the negative electrode and a separator (porosity: 44%) including a heat-resistant porous layer (thickness of 4 μm) containing boehmite particles and an acrylic resin (binder) on one surface of a microporous membrane made of polyethylene and having a thickness of 12 μm were used and a flat wound electrode body was formed by laminating the separator so that the heat-resistant porous layer thereof faced the positive electrode.

The following evaluations were performed on the non-aqueous electrolyte secondary batteries of the examples and the comparative examples.

[Evaluation of OCV]

Initial charge (formation) was performed on 150 batteries of each of the examples and the comparative examples at a constant current (100 mA) and a constant voltage (3.8 V), and charge was stopped when the charging current decreased to 10 mA. Thus, the batteries were in a fully charged state. Then, discharge was continued with a constant current until the voltage reached 2.0 V. Thus, the formation treatment was carried out by performing the charge and the discharge.

Each of the batteries after the formation treatment was subjected to a constant-current and constant-voltage charge for charging each battery at a constant current of 0.2 C (200 mA) until the voltage reached 3.8 V and then continuing charge until a current value decreased to 0.01 C (10 mA) at a constant voltage of 3.8 V. The batteries in the charged state were left to stand in an environment of 23±3° C. for 14 days. Then, the voltages of the batteries were measured. A battery whose voltage decreased to 3.725 V or less was defined as a battery having a low OCV failure, and the failure ratio (%) thereof was determined.

[Measurement of Li Content in Negative Electrode at the End of Charge and Measurement of Thickness of Al Foil in Portion that Did not Face Positive Electrode]

The batteries of each of the examples and the comparative examples were subjected to the formation treatment under the same conditions as those in the evaluation of OCV, and then subjected to a constant-current and constant-voltage charge under the same conditions as those in the evaluation of OCV. Then, each battery was disassembled in an argon gas atmosphere, and the negative electrode was removed. The Li content (%) in 100 atomic % of the total of Li and Al was determined by the method described above. Moreover, the thickness of the Al foil (Al alloy foil or Al foil constituting the clad material) in a portion of the removed negative electrode that did not face the positive electrode was measured.

Table 1 indicates the constitution of the non-aqueous electrolyte secondary batteries of the examples and the comparative examples. Table 2 indicates the results of the evaluations. In table 1, values in parentheses in the section "Used foil" in "Negative electrode" indicate the thicknesses of the foils or the thicknesses of the foils constituting the clad materials. Moreover, values in parentheses in the section "Class" in "Separator" indicate the thicknesses of the separators or the thicknesses of layers constituting the separators.

TABLE 1

| | Negative electrode | | | |
|---|---|---|---|---|
| | Used foil (thickness: μm) | Thickness of Al foil in portion that did not face positive electrode (μm) | Separator Class (thickness: μm) | Porosity (%) |
| Ex. 1 | Al alloy foil (70) | 70 | Nonwoven fabric (20) | 69 |
| Ex. 2 | Al alloy foil (70) | 70 | Microporous membrane (20) | 46 |
| Ex. 3 | Al alloy foil (50) | 50 | Microporous membrane (20) | 46 |
| Ex. 4 | Al alloy foil (80) | 80 | Microporous membrane (20) | 46 |
| Comp. Ex. 1 | Al/Cu/Al clad material (17.5/25/17.5) | 17.5 | Microporous membrane (20) | 46 |
| Comp. Ex. 2 | Al/Cu/Al clad material (17.5/25/17.5) | 17.5 | Microporous membrane (16) and Heat-resistant porous layer (4) | 49 |
| Comp. Ex. 3 | Al alloy foil (40) | 40 | Microporous membrane (12) and Heat-resistant porous layer (4) | 44 |

* Ex.: Example, Comp. Ex.: Comparative Example

TABLE 21

| | Ratio of low OCV failure (%) | Li content (atomic %) |
|---|---|---|
| Ex. 1 | 0 | 13 |
| Ex. 2 | 1.7 | 13 |
| Ex. 3 | 1.9 | 22 |
| Ex. 4 | 0 | 11 |
| Comp. Ex. 1 | 20 | 33 |
| Comp. Ex. 2 | 20 | 33 |
| Comp. Ex. 3 | 19 | 30 |

* Ex.: Example, Comp. Ex.: Comparative Example

As indicated in Tables 1 and 2, the non-aqueous electrolyte secondary batteries of Examples 1-4 having a Li content within a predetermined range with respect to 100 atomic % of the total of Li and Al had a low occurrence ratio of products having a low OCV, and highly reliable batteries were able to be manufactured with good production efficiency. In particular, the batteries of Example 1 in which the nonwoven fabric having a large porosity was used for the separator were able to have a lower occurrence ratio of products having a low OCV than the batteries of Example 2 in which the microporous membrane was used for the separator.

On the other hand, the batteries of Comparative Examples 1-3 including the negative electrodes constituted by the clad materials using the thin Al foils or by the thin Al foil and having a Li content out of the predetermined range with respect to 100 atomic % of the total of Li and Al had a larger occurrence ratio of products having a low OCV than the batteries of Examples 1-4.

The present invention may be embodied in other forms without departing from the spirit or essential characteristics thereof. The embodiments disclosed in this application are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The non-aqueous electrolyte secondary battery of the present invention can be used in various applications to which non-aqueous electrolyte secondary batteries have been applied conventionally, and can suitably be applied to applications, such as power sources of vehicle emergency call systems, in which the capacity is required to be favorably maintained for a long period of time.

DESCRIPTION OF REFERENCE NUMERALS

1 Positive electrode
2 Negative electrode
3 Separator
4 Battery container
6 Flat wound electrode body
9 Sealing cover plate

The invention claimed is:

1. A non-aqueous electrolyte secondary battery, comprising:
    a positive electrode;
    a negative electrode;
    a separator; and
    a non-aqueous electrolyte,
    wherein the positive electrode comprises a positive electrode mixture layer in which a lithium-containing composite oxide is used as a positive electrode active material,
    the negative electrode consists of an aluminum foil or an aluminum alloy foil,
    in a charged state, the negative electrode comprises the aluminum foil or the aluminum alloy foil and a Li—Al alloy formed by reaction with Li ions deintercaleted from the positive electrode, and
    the Li—Al alloy has a Li content of 7 to 29 atomic % with respect to 100 atomic % of a total of Li and Al at the end of charge.

2. The non-aqueous electrolyte secondary battery according to claim 1, wherein the Li content with respect to 100 atomic % of the total of Li and Al is 7 to 25 atomic % at the end of charge.

3. The non-aqueous electrolyte secondary battery according to claim 1, wherein a thickness of the aluminum foil or the aluminum alloy foil in a portion of the negative electrode that does not face the positive electrode mixture layer is 40 μm or more.

4. The non-aqueous electrolyte secondary battery according to claim 1, wherein the separator comprises a nonwoven fabric.

5. The non-aqueous electrolyte secondary battery according to claim 1, wherein the separator has a porosity of 55% or more.

6. A method for manufacturing the non-aqueous electrolyte secondary battery according to claim 1,
    wherein the aluminum foil or the aluminum alloy foil having a thickness of 40 μm or more is used for the negative electrode.

7. A non-aqueous electrolyte secondary battery system, comprising:
    the non-aqueous electrolyte secondary battery according to claim 1; and a charging circuit for charging the non-aqueous electrolyte secondary battery,
wherein in the charging circuit, an end-of-charge condition is set so that the Li content with respect to 100 atomic % of the total of Li and Al in the negative electrode of the non-aqueous electrolyte secondary battery is 7 to 29 atomic % at the end of charge.

* * * * *